United States Patent [19]

Steigelmann

[11] 3,812,651
[45] May 28, 1974

[54] PROCESS FOR SEPARATING GAS BY DIFFUSION

[75] Inventor: Edward F. Steigelmann, Park Forest, Ill.

[73] Assignee: Standard Oil Company, Chicago, Ill.

[22] Filed: July 19, 1972

[21] Appl. No.: 273,215

[52] U.S. Cl. .................................................. 55/16
[51] Int. Cl. ........................................... B01d 53/22
[58] Field of Search ............................... 55/16, 158

[56] References Cited
UNITED STATES PATENTS

| | | | |
|---|---|---|---|
| 3,396,510 | 8/1968 | Ward et al. | 55/16 |
| 3,447,286 | 6/1969 | Dounoucos | 55/16 |
| 3,566,580 | 3/1971 | Li | 55/16 |

Primary Examiner—Charles N. Hart

[57] ABSTRACT

There is described the separation of aliphatically-unsaturated hydrocarbons of two to four carbon atoms from gaseous mixtures by the combined use of liquid barrier permeation and metal complexing techniques. The liquid barrier is in contact with a film membrane, and the barrier contains complex-forming metal ions in aqueous solution. The film membrane is contacted with a swelling agent to increase the selectivity of the separation and, preferably, increase permeation by the aliphatically unsaturated hydrocarbon to be separated. The metal ions in the liquid barrier may be, for example, noble metal, nickel, mercurous, cuprous or other metal ions, and mixtures of the metal ions, with or without other cations, may be used. The separation of ethylene from ethane and methane is of particular interest.

17 Claims, No Drawings

PROCESS FOR SEPARATING GAS BY DIFFUSION

This invention relates to the separation of aliphatically unsaturated hydrocarbons having two to four carbon atoms from gaseous mixtures containing the hydrocarbons to be separated, along with other material. More particularly, this invention is concerned with the separation of aliphatically unsaturated hydrocarbons by the combined use of liquid barrier permeation and metal complexing techniques. The liquid barrier containing complex-forming metal ions in aqueous solution is in contact with a film membrane, and the latter is contacted with a swelling agent for the film to increase the selectivity of the separation and, preferably, the rate of permeation of the film by the hydrocarbon separated. The invention is especially useful for separating ethylene from gaseous mixtures containing it, other hydrocarbons, for example, one or both of ethane and methane, and with or without hydrogen.

There is considerable commercial interest in separating various aliphatically unsaturated hydrocarbons from mixtures containing them. These unsaturated hydrocarbons are reactive materials that serve in various roles, generally as intermediates in chemical syntheses. A number of the unsaturated hydrocarbons are employed as monomers in the formation of polymers and in this regard, olefins such as ethylene, propylene and butadiene are well known. These olefins, as well as other unsaturated materials, for instance, acetylene, are also used to form relatively low molecular weight products.

The aliphatically unsaturated hydrocarbons are most often available on a commercial basis in admixture with other chemical compounds, frequently other hydrocarbons. These hydrocarbon-containing streams are usually by-products of chemical syntheses or separation processes. When the hydrocarbon streams are liquid under normal conditions or can readily be made so, ordinary distillation techniques can be used to separate the hydrocarbon components providing they have sufficiently different boiling points for the process to be economically feasible. Especially when the hydrocarbon mixtures contain materials having close boiling points, which is often the case with hydrocarbons of the same number of carbon atoms or having a difference of only one carbon atom, distillation may not be an attractive separation procedure. In such cases, more costly processes are often used and involve operations such as solvent extraction or extractive distillation which entail considerable expense, if indeed they are technically feasible in a given situation.

When the mixture containing the aliphatically unsaturated hydrocarbon is in an essentially gaseous state at normal or ambient conditions of temperature and pressure, separation of the desired component from the mixture may be even more troublesome. In these situations, cryogenic processes may be used, but they are expensive. The components of these normally gaseous mixtures may not even have particularly close boiling points, but nevertheless the mixture must be cooled in order to separate one or more of its components. In spite of the considerable cost of cryogenic operations, the procedure has been employed commercially for the separation of ethylene from other gaseous materials such as ethane and methane.

Copending patent application Ser. No. 252,607, filed May 12, 1972, U.S. Pat. No. 3,758,603 in the names of Edward F. Steigelmann and Robert D. Hughes, is directed to a method for separating aliphatically unsaturated hydrocarbons from gaseous mixtures containing them, and involves the combined use of liquid barrier permeation and metal complexing techniques which can exhibit high selectivity factors. In the process the liquid barrier is an aqueous solution containing metal ions which will complex with the unsaturated hydrocarbon to be separated. This liquid barrier is in contact with a semi-permeable film membrane which may be a synthetic polymer. It is desirable to increase the selectivity of the separation, and also to increase the permeation rate through the film of the unsaturated hydrocarbon which is being separated.

In the present invention I increase the separation selectivity and, preferably, improve the rate of separation of $C_2$ to $C_4$ aliphatically unsaturated hydrocarbons, by contacting the semi-permeable film membrane with a swelling agent. This agent makes the film-liquid barrier perform more selectively in the separation and may increase the permeation rate of the unsaturated hydrocarbon. Although the film membrane can be treated with the swelling agent before the film is in contact with the complexing metal-containing aqueous medium employed in the process of this invention, it is advantageous to provide contact of the film membrane with the swelling agent as the separation proceeds whether or not the film has been pretreated with the swelling agent. This can be done, for instance, by including the swelling agent in the gaseous feed containing the aliphatically unsaturated hydrocarbon to be separated, in the metal ion-containing aqueous medium in contact with the film, or by using combinations of these manners of addition, or indeed any other procedure that is desired.

The amount of swelling agent contacted with the film membrane is sufficient to provide a significant increase in the selectivity of the separation, that is, the product separated is purer in the desired component than that obtained when the swelling agent is not employed. This amount may also be sufficient to give a substantial increase in the permeation rate through the film barrier, of the aliphatically unsaturated hydrocarbon which is undergoing separation as evidenced by an increase in its rate of separation compared with that obtained in the absence of the swelling agent contact. The amount of the swelling agent contacting the film should not be so great as to materially weaken the polymer structure and cause degeneration of the polymer film to the extent that it cannot be used on a practical basis. These amounts may also be affected by choice of polymer and swelling agent, as well as the temperature and pressure of the film membrane during its use in the separation procedure. The amount of swelling agent present in the separation zone at any given time is usually a minor weight amount of the film. This amount is often at least about 1 percent and may be considerably greater, for example, up to about 30 or 40 percent or more, and preferably the amount is about 5 to 15 percent, based on the weight of the film membrane.

The swelling agents which can be employed in this invention are essentially inert to the complexing metal solution and the gaseous mixture undergoing separation at the conditions of the operation. The swelling agent may be in the liquid or vapor phase when contacting the film membrane, although vapor phase contact is preferred. The swelling agents are organic materials which may be essentially water-insoluble or exhibit water-solubility. These agents have at least some solubility for the film membrane with which the swelling agent is employed in the method of this invention; however, in a given situation the choice of agent and the amount employed should not cause undue disintegration or dissolution of the film so that it cannot perform in the method satisfactorily on a practical basis. Generally, the hydrocarbon swelling agents have at least five carbon atoms and they may be saturated or unsaturated materials and aliphatic, cycloaliphatic, aromatic or have mixed structures of these types. The swelling agent may contain elements other than carbon and hydrogen, for instance, they may include one or more of oxygen, sulfur and nitrogen in their molecules. The swelling agents are preferably liquid at ambient temperature and pressure, and usually they have a higher boiling point than the unsaturated hydrocarbon to be separated. Among the swelling agents may be, for instance, alcohols, ketones, nitriles, furans, esters, disulfides and the like.

The choice of swelling agent for use in a given operation may depend on the composition of the polymer film membrane and in this regard various materials are known to be swelling agents for given polymers. Thus one may use aromatic hydrocarbons such as benzene, toluene or xylene to swell essentially hydrocarbon polymer films such as the polyethylene, polypropylene or ethylene-propylene copolymer films. Other film — swelling agent combinations are, for example, polyvinyl acetate films — benzene, toluene, benzyl alcohol, dimethyl tetrahydrofuran, dioxane or acetonitrile swelling agents; polyvinyl chloride films — tetrahydrofuran or methylethyl ketone swelling agents; polystyrene films — cyclohexane, methylcyclohexane, tetrahydrofuran, dioxane, methylethyl ketone, diisopropyl ketone, ethyl acetate or carbon disulfide swelling agents. Other polymer-solvent or swelling agent combinations which may be used are given in the tables in Polymer Handbook, edited by Brandrup and Immergut, pages IV-187 to IV-199, Interscience Publishers, New York 1966, incorporated herein by reference.

The film membranes in contact with the swelling agent in the process of this invention are of the essentially solid, semi-permeable type. In the absence of a liquid containing the complex-forming metal ions, the film may be permeable to essentially all of the components in the feedstock used in this invention when they are in the gaseous phase. However, by having the film in contact with sufficient aqueous liquid to form a barrier the physical passage of gas through the film is reduced or prevented, and the components of the feed stream must therefore traverse the separation zone primarily by becoming part of and then being separated from the aqueous liquid phase. Thus in the absence of the complex-forming metal ion in the aqueous medium, there could be a slight separation of hydrocarbons effected by the use of water as the liquid medium since the individual hydrocarbons may exhibit different solubilities in water. In the method of the present invention, however, the selectivity of the separation of aliphatically unsaturated hydrocarbons is greatly increased due to the presence of the complex-forming metal ions in the aqueous barrier medium contacting the film.

The film membranes which can be employed in this invention serve to prevent the passage of significant amounts of liquid complexing solution through the film under the conditions at which the operation is conducted. Such films are exemplified by polyethylene, polypropylene, ethylene-propylene copolymer, nylon, polyvinyl acetate, polystyrene, and polyvinyl chloride films. The usefulness of the films is enhanced by treating or contacting them with a swelling agent in accordance with this invention, and I have found that this increases the selectivity of the separation, and preferably the permeation rate, of the aliphatically unsaturated hydrocarbon.

Since an aqueous medium is employed in this system the film may exhibit hygroscopic characteristics and be essentially unreactive with the complexing ions in the liquid barrier. The films can be readily made and some are commercially available. The film membrane may be self-supporting and have sufficient strength not to require any additional supporting material on either of its sides during use. With some films, however, it may be necessary or advantageous to provide adequate support such as additional film or sheet-like materials on one or both sides of the film membrane. These supporting structures are frequently very thin materials and may be permeable to both liquids and gases and may not serve a separating function with respect to any component of the feed stream.

The film membrane may be in any desirable physical shape. Flat film sheets is one useable form, although greater surface areas and more efficient separation may be provided by using tubular fibers of the types disclosed in, for instance, U.S. Pat. No. 3,228,877, herein incorporated by reference. This patent describes a variety of hydrophobic or hydrophilic hollow fibers which may be employed in the present invention, for example, those of cellulose acetate, nylon, polyvinyl chloride, polyvinyl alcohol, olefin polymers such as polyethylene, polyethylene, polypropylene and ethylene-propylene copolymers, and the like. Suitable membranes are described in "Gas Permeability of Plastics," Major et al., Modern Plastics, page 135 et. seq., July, 1962; and U.S. Pat. Nos. 3,133,132; 3,133,137; 3,256,675; 3,274,750; 3,325,330; 3,335,545, 3,396,510 and 3,447,286, all incorporated herein by reference. The film membranes may often have a thickness up to about 5 or 10 mils or more, and I prefer to employ membranes having a thickness up to about 1 mil. The film must have sufficient thickness to avoid rupture at the pressure employed, and usually the films may have a thickness of at least about 0.001 mil.

The method of this invention can be employed alone to separate one or more $C_2$ to $C_4$ unsaturated hydrocarbons, or it may be used in conjunction with other separating steps, for instance, a cryogenic operation, and still be economically advantageous compared with an all-cryogenic system. Although the unsaturated hydrocarbon product provided by the method of this invention may be a quite pure material, for instance, of greater than 99 percent purity, the separation procedure may be used merely to provide a significant increase in the concentration of a given unsaturated hydrocarbon in a mixture with other components of the feedstock.

The process of this invention can be employed to separate various $C_2$ to $C_4$ aliphatically unsaturated hydrocarbons from other ingredients of the feed mixture providing at least one of the aliphatically unsaturated hydrocarbons exhibits a transfer rate through the liquid barrier that is greater than at least one other dissimilar component of the feedstock. Quite advantageously, the system can be used to separate these unsaturated hydrocarbons from other hydrocarbons which may be aliphatically saturated or aliphatically unsaturated or from non-hydrocarbon materials, including fixed gases such as hydrogen. The feed mixture may thus contain one or more paraffins, including cycloparaffins, mono or polyolefins, which may be cyclic or acyclic, and acetylenes or alkynes. Often the feed mixture contains one or more other hydrocarbons having the same number of carbon atoms as the unsaturated hydrocarbon to be separated or only a one carbon atom difference. Among the materials which may be separated according to this invention are ethylene, propylene, butenes, butadiene and acetylene.

In the method of the present invention, the mixture containing the aliphatically unsaturated hydrocarbon to be separated is essentially in the gaseous or vapor phase when in contact with a liquid barrier having dissolved therein one or more metal ions which form a complex with the unsaturated hydrocarbon. The liquid barrier is in contact with a semi-permeable membrane which is essentially impermeable to the liquid but permeable to the aliphatically unsaturated hydrocarbon-containing mixture at the conditions used during the separation. The semi-permeable membrane may, for instance, be of the type that has been employed heretofore for the separation or purification of various chemical materials. The liquid barrier can be formed by using the semi-permeable membrane in a number of ways, and the membrane can be said to immobilize the liquid barrier within or adjacent to the feed side of the membrane. Thus the liquid barrier may be held between two solid, gas permeable films which prevent passage of the liquid therethrough. In this structure the liquid barrier may be formed by supporting the liquid on a surface which is permeable to the gaseous feed but impermeable to the liquid, and the feedstock can then be passed into the liquid layer. The liquid barrier may be partly or completely absorbed in the supporting structure providing the exit side of the structure is impermeable to the liquid under the conditions of operation, but permeable to the gaseous feedstock in the absence of the liquid barrier. Thus the liquid barrier may be a continuous liquid film or layer or it may be discontinuous as may be the case when the liquid is held within a solid support. In any event, however, there is little, if any, passage for the gaseous feedstock across the separation zone except by becoming part of the liquid barrier phase, and thus this liquid barrier controls the selectivity of the liquid barrier-semi-permeable membrane combination.

The liquid barrier contains sufficient water and soluble metal ions to form a suitable complex with at least one aliphatically unsaturated hydrocarbon component of the gaseous feed. The metal ions readily form the complex upon contact with the gaseous feed, and, in addition, the complex dissociates back to the metal ion and an aliphatically unsaturated hydrocarbon component of the complex, under the conditions which exist on the discharge side of the liquid barrier and semi-permeable membrane as employed in this invention. The released aliphatically unsaturated hydrocarbons exit the discharge side of the membrane and can be removed from the vicinity of the membrane and its supporting structure as by a sweep gas or through the effect of vacuum on this side of the membrane. Thus the unsaturated hydrocarbon-metal complex forms and is decomposed upon its travel through the metal ion-containing liquid barrier, and as a result the material passing through the barrier is more concentrated with respect to at least one aliphatically unsaturated hydrocarbon component present in the feed stream.

Often the reactivity of aliphatically unsaturated hydrocarbons with the complex-forming metal ions, in their order of decreasing activity goes from acetylenes or dienes to mono-olefins, the aliphatically saturated hydrocarbons being essentially non-reactive. Also different reactivities may be exhibited among the various members of a given type of aliphatically unsaturated hydrocarbon. The process of this invention can thus be used to separate paraffins from monoolefins, di-olefins or acetylenes; diolefins from monoolefins; or acetylenes from paraffins, monoolefins or diolefins; as well as to separate a given aliphatically unsaturated hydrocarbon from another of such materials in its same class providing the members have differing transport rates across the liquid barrier. The feed gas need only contain a small amount of aliphatically unsaturated hydrocarbon, as long as the amount is sufficient so that the unsaturated material to be separated selectively reacts with the metal complex ions to a significant extent, and thus at least one other component of the feed is less reactive or non-reactive with the complex-forming metal ions. The separation of ethylene or propylene from admixtures with other normally gaseous materials, such as one or more of ethane, methane, propane and hydrogen is of particular importance. Frequently the feed mixture to the process contains about 1 to 50 weight percent ethylene, about 0 to 50 weight percent ethane and about 0 to 50 weight percent methane. Another process that may be of special significance is the separation from ethylene of minor amounts of acetylene.

The partial pressure of the aliphatically unsaturated component of the gaseous feed at the input side of the liquid barrier used in the present invention is greater than the partial pressure of this unsaturated component on the discharge or exit side of the liquid barrier and semi-permeable membrane. This pressure drop may often be at least about 0.5 pound per square inch, and is preferably at least about 20 psi, although the pressure drop should not be so great that the liquid barrier is ruptured or otherwise deleteriously affected to a significant extent. Conveniently, the total pressure of the gaseous feed is up to about 1,000 pounds per square inch. The discharge partial pressure of the unsaturated hydrocarbon can preferably be controlled by subjecting the exit side of the liquid barrier to the action of a sweep gas that may be essentially inert to forming a complex with the metal ions of the aqueous solution in liquid barrier. The sweep gas picks up the discharged aliphatically unsaturated components, and the sweep gas may be selected so that it can be readily separated from the unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier-semi-permeable film combination employed in the method of this invention can be essentially constant or it may vary, and the decomposition of the metal-unsaturated hydrocarbon complex can be effected primarily by the drop in partial pressure of the aliphatically unsaturated hydrocarbon on the exit side of the liquid barrier compared with that on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often the temperature may be up to about 100° C., and elevated temperatures may even be required to put the feedstock in the gaseous or vapor phase. Neither the temperature nor the pressure used should, however, be such as to destroy the difference in transport rate across the liquid barrier-semipermeable film combination of the aliphatically unsaturated hydrocarbons whose separation is sought, compared with that of the other components of the feed. These conditions should also not be such that physical disruption of the liquid barrier or any other significant malfunction results.

In the present invention I may use the metals which serve in the form of metal-containing cations to separate aliphatically unsaturated hydrocarbons in the feed mixture through the formation of metal complexes of desired properties, and these metals include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g., nickel and iron. Others of the useful complex-forming metals are in the second and third transition series, i.e., having atomic numbers from 39 to 47 or 57 to 79, as well as mercury, particularly as the mercurous ion. Thus we may employ noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complexing-forming metals may also be employed in this invention, either in the presence or absence of other non-metal or non-complexing metal cations.

The metal is provided in the aqueous liquid barrier in contact with the semi-permeable membrane in a form which is soluble in this liquid. Thus the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes. The metal salts should not react with any components of the aliphatically unsaturated hydrocarbon-containing feed to form an insoluble material which could block the film membrane or otherwise prevent the separation of the desired component of the feedstock. Also in a given system, the metal is selected so that the complex will readily form and yet be sufficiently unstable so that the complex will decompose and the dissociated unsaturated hydrocarbon leave the liquid barrier, thereby providing a greater concentration of the aliphatically unsaturated hydrocarbon to be separated from the exit side of the membrane than in the feed. The concentration of the metal ions in the liquid barrier may be rather low and still be sufficient to provide an adequate complexing rate so that excessive amounts of the semipermeable membrane surface will not be needed to perform the desired separation. Conveniently, the concentration of the complex-forming metal ions in the aqueous solution forming the liquid barrier is at least about 0.1 molar, and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed in this invention are cuprous ions, ammonium ions can be used to provide copper ammonium complex ions which are active to form a complex with the aliphatically unsaturated hydrocarbons to be separated. I preferably supply about equimolar amounts of cuprous and ammonium ions in the liquid barrier solution, although either type of ions may be in excess. The ammonium ions can be provided in various convenient ways, preferably as an acid salt such as ammonium chloride. In order to enhance the selectivity of the copper ammonium ion complex in the separation of this invention, I may also make the liquid barrier solution more acidic, by, for instance, providing a water-soluble acid such as a mineral acid, especially hydrochloric acid in the solution. Preferably, the pH of the liquid barrier in this form of the invention is below about 5 with the acid in the solution. Since silver may form undesirable acetylides with acetylenes, the copper ammonium complex may be a more attractive complexing agent when it is desired to separate acetylenes from its various mixtures.

Instead of supplying only a noble metal for complexing the aliphatically unsaturated hydrocarbon in the process of this invention, I may also employ mixtures of noble metal and other cations. Work has shown that as the noble metal concentration increases the selectivity of the desired separation is enhanced, and a portion of the noble metal may be replaced by non-noble metal or ammonium ions and selectivities generally comparable to those obtained with the same concentration of noble metal ions may be obtained. This result has been reached even though the non-noble metal or ammonium ion when used by itself in an effort to accomplish the desired separation, may be ineffective or only marginally suitable. Accordingly, the total of such ions in the liquid barrier may be composed of a minor or major amount of either the noble metal ions or the non-noble metal, ammonium or other cations. Solutions having a major amount of the non-noble metal, ammonium or other cations not containing a noble metal, will generally be less expensive, and, accordingly, the noble metal may be as little as about 10 molar percent or less of the total cations in the solution. To reduce expenses at least about 10 molar percent, preferably at least about 50 molar percent, of the total cations may be other than the noble metal cations. The non-noble or base metals are preferably of Groups II to VIII of the Periodic Chart of Elements, and especially those in the fourth and fifth periods, aluminum and magnesium. Zinc and cupric ions are preferred ones among these non-noble or base metal ions. The various cations may be provided in the liquid barrier in the form of any suitable compound such as the acid salt forms mentioned above with respect to the noble metals.

The amount of water in the liquid barrier employed in this invention may be a minor portion of the liquid phase, but preferably is a major portion or even essentially all of the liquid, on a metal salt-free basis. Thus small amounts of water, say as little as about 5 weight percent, on a salt-free basis in the liquid phase may serve to provide significant transport for the aliphatically unsaturated hydrocarbons across the liquid barrier. Any other liquid present in the barrier is preferably water-miscible and should be chosen as not to have a substantial deleterious effect on the separation to be accomplished.

As stated, in the system of the present invention the film membrane is in contact with the aqueous barrier having dissolved therein the complex-forming metal ions. In one form of the invention this contact may be provided by a liquid aqueous phase being more or less absorbed within the film with no separate aqueous phase existing as a substantial layer on the inlet side of the film. The film membrane can be wetted initially, and if it has a tendency to dry during use, additional water can be placed in the film, for instance, by inclusion of moisture in the hydrocarbon feed charged to the system. The wetness of the film can also be maintained terials leaving the membrane and then exited the cell by the lower outlet as a product stream. The product was analyzed by gas chromatography.

The cell as used to separate ethylene from a mixed hydrocarbon gas stream while employing silver ions as the complex-forming metal. The membrane was a film of 98.3 percent polypropylene — 1.7 percent polyethylene copolymer having a thickness of 0.87 mil. On top of this film was placed a layer of an aqueous complexing solution which was 0.3 ml. of a 6 M silver nitrate solution. The feed gas was a mixture of methane, ethane and ethylene, and the gas was fed to the cell at 20 psig and was bubbled through the complexing solution at the rate of 50 ml./min. The reverse or exit side of the membrane was swept with nitrogen at the rate of 10 ml./min. In one test benzene was incorporated in the feed gas as a swelling agent for the film while in the other run no benzene was present. The benzene was added by first bubbling the feed through benzene to saturate the benzene with swelling agent vapor, and then passing the resulting benzene-containing effluent into the cell. The results of these tests were as follows:

Table I

| Charge | Permeation Rate (ml./cm² min.) | Composition of Permeate, Weight %, Nitrogen-free basis | | | S.F.* |
|---|---|---|---|---|---|
| | | $CH_4$ | $C_2H_4$ | $C_2H_6$ | |
| (Feed | | 22.1 | 41.0 | 36.9) | — |
| Feed | 0.00091 | 5.5 | 86.1 | 8.4 | 8.9 |
| Feed plus benzene | 0.0117 | 1.2 | 96.7 | 2.1 | 42.2 |

*S.F. = ethylene selectivity factor =
$$\frac{\text{Conc. of } C_2H_4 \text{ in Permeate}}{\text{Conc. of } CH_4+C_2H_6 \text{ in Permeate}} \times \frac{\text{Conc. of } CH_4+C_2H_6 \text{ in Feed}}{\text{Conc. of } C_2H_4 \text{ in Feed}}$$

by having a separate aqueous phase such as the solution of the complex-forming ions, adjacent to the inlet side of the film and preferably in contact with essentially all of this side of the film during its use to separate the aliphatically unsaturated hydrocarbons. In any event, care should be taken to insure that the film membrane during use is not so dry that it will exhibit non-selective permeability to the components of the gaseous feed and will thereby not serve to increase the concentration of an aliphatically unsaturated hydrocarbon charged to the system.

The method of this invention will be further described with reference to the following specific examples.

EXAMPLE 1

A glass test cell was divided into upper and lower compartments by locating a semi-permeable film membrane horizontally across the cell with the 2.8 cm² cross-section of the cell being fully covered by the film. The cell had a gas outlet at each end. A feed inlet tube entered the upper end of the cell and ended slightly above the membrane so that the feed gas was bubbled into the liquid phase held by the film membrane. A sweep gas inlet tube entered the lower end of the cell ended slightly below the membrane. The feed was charged into the upper portion of the cell, and the exhaust or raffinate components of the gas left the cell by the upper outlet. The feed rate was considered to be sufficient to maintain a constant gas composition on the inlet side of the membrane. A sweep gas contacted the lower surface of the membrane, picked-up the ma- The data show that permeation rate in the test using the benzene-containing feed was increased more than ten-fold compared with the non-benzene run. Also, selectivity did not decrease in the case of using the benzene-containing feed and, in fact, selectivity increased several-fold. Even higher permeation rates should be achieved at higher pressures and benzene concentrations.

EXAMPLE 2

Cells similar to that in Example 1 were used for testing the effectiveness of many various swelling agents in the method of this invention. The tests were similar to those in Example 1 except the feed gas was at 40 psig, the feed gas rate was 20 ml./min. and the position of the feed inlet tube was above the AgNO₃ solution instead of in it. The last two changes may have reduced the amount of swelling agent reaching the membrane and thus reduced the magnitude of the permeability effect. In the present test, benzene increased the ethylene permeability through the polypropylene/polyethylene membrane three times compared with the ten-fold increase shown in Example 1 and this difference was apparently due primarily to the change in operating conditions.

Two different barrier membranes were tested. The first was the polypropylene-polyethylene copolymer film used in Example 1 and the second membrane was an alcohol-soluble, 8061 form, Zytel (DuPont), nylon resin film, designated by DuPont as composition 42, color Ng 410, 1 mil thick. Each film was loaded into a cell and 0.3 ml. of 6N AgNO₃ was placed on top of it.

The tests were run in the following manner: A methane-ethane-ethylene feed passed into the cell at 40 psig and through it at a feed by pass rate of 20 ml./min. A nitrogen purge at 10 ml./min. swept the reverse side of the membrane. Feed and product compositions and product permeation rates were determined by gas chromatography. The various swelling agents were supplied to the membrane by bubbling the feed first through the swelling agent. Occasionally, the swelling agent was heated to increase its content in the feed. The temperature to which it was heated is indicated in Tables II and III by a number in parenthesis following the name of the particular swelling agent. In the series of tests a new barrier membrane was used for each different swelling agent. The results are given in Tables II and III.

Table II

Propylene-Ethylene Copolymer Film

| Swelling Agent | S.F. | Permeation Rate (ml./cm.² min.) | Composition of Permeate, Wt. %, N₂-free Basis | | |
|---|---|---|---|---|---|
| | | | % CH₄ | % C₂H₄ | % C₂H₆ |
| (Feed Composition | — | — | 15.3 | 40.0 | 44.7) |
| No Swelling Agent | 7.0 | .0027 | 5.8 | 82.4 | 11.8 |
| Benzene (180°F.) | 28.5 | .0068 | 1.5 | 95.0 | 3.5 |
| Hexene-1 | 38.8 | .0061 | 1.2 | 96.3 | 2.5 |
| Xylene (140°F.) | 20.8 | .0036 | 2.1 | 93.2 | 4.7 |
| Cyclohexane | 14.0 | .0019 | 3.3 | 90.3 | 6.4 |
| Methanol (160°F.) | 5.1 | .0023 | 6.2 | 77.3 | 16.5 |
| Chloroform | | | Slowly disintegrates film | | |

Table III

Nylon Film Membrane

| Swelling Agent | S.F. | Permeation Rate (ml./cm² min.) | Composition of Permeate, Wt. %, N₂-free Basis | | |
|---|---|---|---|---|---|
| | | | % CH₄ | C₂H₄ | % C₂H₆ |
| (Feed Composition | — | — | 15.3 | 40.0 | 44.7) |
| No Swelling Agent | 3.8 | .0020 | 5.6 | 71.7 | 22.7 |
| Benzene (180°F.) | 29.2 | .0023 | 1.6 | 95.1 | 3.3 |
| Hexene-1 | 56.6 | .0028 | 0.9 | 97.4 | 1.7 |
| Xylene (140°F.) | 33.8 | .0015 | 1.3 | 95.8 | 2.9 |
| Cyclohexane | 112.0 | .0008 | 1.1 | 98.5 | 0.2 |
| Methanol (160°F.) | 11.1 | .0019 | 2.8 | 88.1 | 9.1 |
| Chloroform | | | Slowly disintegrates film | | |

It is seen that six different swelling agents were tested and one of these, chloroform, slowly disintegrated both barrier films. Use of the other swelling agents showed differing effects. The swelling agent giving the best performance, considering both permeation rate and selectivity, was hexane-1 followed by benzene and xylene. All three of these agents not only increased the permeability but all three likewise sharply increased selectivity. The use of cyclohexane as the swelling agent increased the selectivity greatly, but did not improve permeability. Its effect on the nylon film was especially unusual since permeability decreased, but selectivity increased from 4 to 112. General permeability and selectivity have changed in the same direction upon the use of the swelling agent. The data of Table II show that methanol is not an effective swelling agent for the polypropylene-polyethylene membrane and its swelling action on the nylon resin was limited.

It is claimed:

1. A method for separating aliphatically unsaturated hydrocarbon of two to four carbon atoms which comprises contacting from a first side of an essentially solid, semi-permeable polymer film, a vaporous mixture containing said unsaturated hydrocarbon with an aqueous liquid barrier in contact with said semi-permeable polymer film which is essentially impermeable to said aqueous liquid, said liquid barrier having therein metal ions which combine with said unsaturated hydrocarbon to form a water-soluble complex, the partial pressure of said unsaturated hydrocarbon on a second side of said semi-permeable film being sufficiently less than the partial pressure of said unsaturated hydrocarbon in said vaporous mixture to provide separated unsaturated hydrocarbon on said second side of said semi-permeable film, said film being contacted with a sufficient amount of an organic swelling agent for said film to increase the selectivity of the separation of said unsaturated hydrocarbon, and removing separated unsaturated hydrocarbon from the vicinity of said second side of said semi-permeable polymer film.

2. The method of claim 1 in which said unsaturated hydrocarbon separated is ethylene.

3. The method of claim 2 in which said vaporous mixture contains ethylene in admixture with one or both of methane and ethane.

4. The method of claim 3 in which the film is propylene-ethylene copolymer.

5. The method of claim 4 in which the swelling agent is liquid aromatic hydrocarbon.

6. The method of claim 5 in which the swelling agent is benzene.

7. The method of claim 1 in which said metal ions are noble metal ions.

8. The method of claim 7 in which the noble metal ions are silver.

9. The method of claim 8 in which the unsaturated hydrocarbon separated is ethylene.

10. The method of claim 9 in which the film is propylene-ethylene copolymer.

11. The method of claim 10 in which said vaporous mixture contains ethylene in admixture with one or both of methane and ethane.

12. The method of claim 1 in which the film is propylene-ethylene copolymer.

13. The method of claim 12 in which the swelling agent is a liquid aromatic hydrocarbon.

14. The method of claim 13 in which the swelling agent is benzene.

15. The method of claim 1 in which the swelling agent is liquid aromatic hydrocarbon.

16. The method of claim 15 in which the unsaturated hydrocarbon separated is ethylene.

17. The method of claim 16 in which the swelling agent is benzene.

* * * * *